(12) United States Patent
De Silva et al.

(10) Patent No.: US 8,285,481 B2
(45) Date of Patent: Oct. 9, 2012

(54) METHOD AND APPARATUS FOR ASSOCIATING BRAND ICON WITH POI LOCATION FOR NAVIGATION SYSTEM

(75) Inventors: Andrew De Silva, Torrance, CA (US); Linh Doan, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1424 days.

(21) Appl. No.: 11/502,010

(22) Filed: Aug. 10, 2006

(65) Prior Publication Data

US 2008/0082262 A1   Apr. 3, 2008

(51) Int. Cl.
G01C 21/00 (2006.01)
G01C 21/32 (2006.01)
G08G 1/123 (2006.01)
G06F 17/00 (2006.01)
G09G 5/00 (2006.01)

(52) U.S. Cl. ........ 701/409; 701/438; 701/454; 701/532; 701/538; 340/995.18; 340/995.24; 340/995.27; 345/619

(58) Field of Classification Search .......... 701/200, 701/206, 207, 208, 211, 212, 213, 400, 408, 701/409, 438, 454, 467, 532, 538; 340/995.27, 340/995.26, 995.23, 995.24, 995.16–995.18, 340/995.14, 995.1, 988, 990; 345/619, 629, 345/650, 655
See application file for complete search history.

(56) References Cited

U.S. PATENT DOCUMENTS

| | | | |
|---|---|---|---|
| 5,552,989 A * | 9/1996 | Bertrand | 701/200 |
| 6,405,129 B1 * | 6/2002 | Yokota | 701/208 |
| 6,542,813 B1 * | 4/2003 | Kovacs | 701/208 |
| 6,952,644 B2 * | 10/2005 | Nakagawa | 701/200 |
| 2002/0065605 A1 * | 5/2002 | Yokota | 701/211 |
| 2002/0130906 A1 * | 9/2002 | Miyaki | 345/837 |
| 2003/0201914 A1 * | 10/2003 | Fujiwara et al. | 340/995.24 |
| 2004/0012506 A1 * | 1/2004 | Fujiwara et al. | 340/995.1 |
| 2004/0243306 A1 * | 12/2004 | Han | 701/211 |
| 2005/0125144 A1 * | 6/2005 | Nakagawa | 701/200 |
| 2005/0273252 A1 * | 12/2005 | Nix et al. | 701/201 |
| 2006/0217883 A1 * | 9/2006 | Nomura | 701/208 |
| 2007/0050128 A1 * | 3/2007 | Lee et al. | 701/200 |
| 2007/0109148 A1 * | 5/2007 | Wada | 340/995.17 |

FOREIGN PATENT DOCUMENTS

JP   2002-5680   1/2002

* cited by examiner

Primary Examiner — Thomas H. Tarcza
Assistant Examiner — Edward Pipala
(74) Attorney, Agent, or Firm — Muramatsu & Associates

(57) ABSTRACT

A method and apparatus for a navigation system automatically assigns or allows a user to assign a brand icon to a particular location. The navigation system displays the assigned brand icon as well as generic icons on a map image. Thus, the navigation system enables the user to quickly distinguish a particular place such as a point of interest (POI) from other similar type of POIs on a map image. The user can identify a particular chain restaurant from other restaurant by the brand icon unique to the particular chain restaurant on the map image so that the user can easily specify the favorite restaurant as a destination.

16 Claims, 14 Drawing Sheets

Fig. 1A
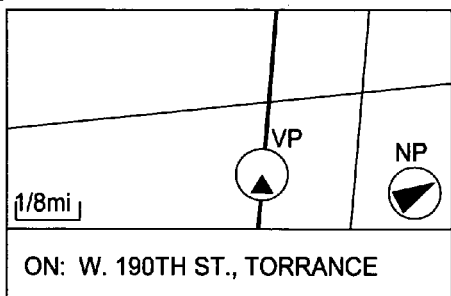
Fig. 1B
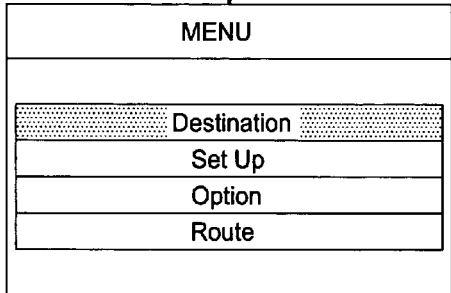
Fig. 1C
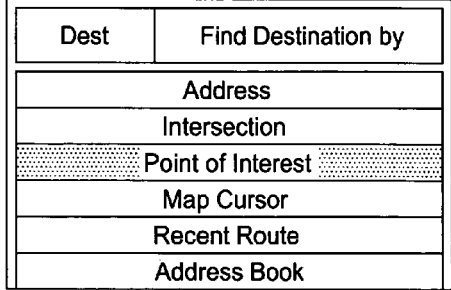
Fig. 1D
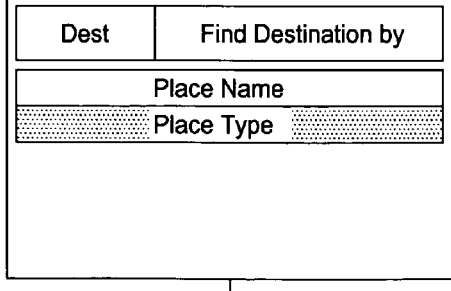
Fig. 1E
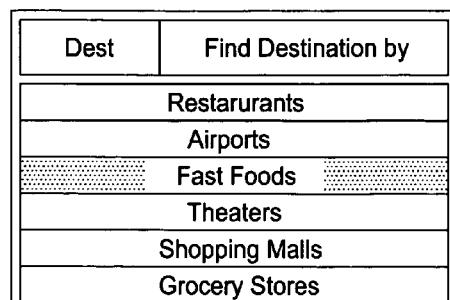
Fig. 1F
| Fast Foods | Hit 397 |
|---|---|
| Burger King | 1.23mi ↘ |
| Carl's Jr. | 1.45mi ↗ |
| Kentucky Fried Chicken | 1.69mi ↑ |
| Pizza Hut | 2.21mi ↘ |
| Del Taco | 2.67mi ↗ |
Fig. 1G
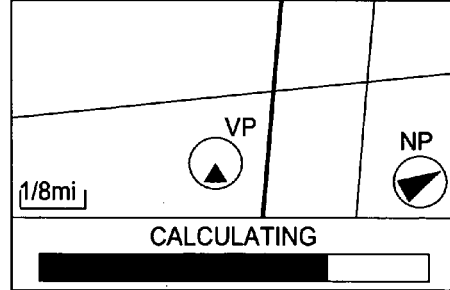
Fig. 1H
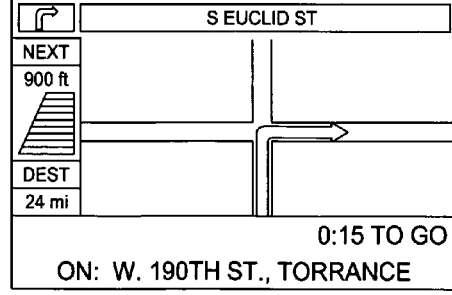

Fig. 4A

```
┌─────────────────────────────────────────────────┐
│ Dest        Input Name                    [≡]  │
├─────────────────────────────────────────────────┤
│  [ Name:   ]  YOSHINOYA                         │
│  [ Address:]  1825  REDONDO BEACH BLVD,G        │
│  [ Phone:  ]  (310)532-3063                     │
│  [ Folder: ]  DEFAULT                           │
│  [ Option: ]  Record Voice Tag        [ Icon ]  │
│  [↩]                   [ Done ]          [▲]   │
└─────────────────────────────────────────────────┘
```

Fig. 4B

```
┌─────────────────────────────────────────────────┐
│ Dest        Input Phone Number            [≡]  │
├─────────────────────────────────────────────────┤
│  (310)532-3082 □                                │
│                                                 │
│            [ 1 ]   [ 2 ]   [ 3 ]                │
│            [ 4 ]   [ 5 ]   [ 6 ]                │
│            [ 7 ]   [ 8 ]   [ 9 ]                │
│          [Delete]  [ 0 ]  [Save]                │
│  [↩]                                     [▲]   │
└─────────────────────────────────────────────────┘
```

Fig. 6E

Fig. 8
| Franchise / Brand ID | Franchise / Brand Name | Icon |
|---|---|---|
| #XXDFDFSD | YOSHINOYA |  |
| #XXFADDDD | CARL'S JR |  |
| #XXDFDFSD | VONS | VONS |
| . . . . . . . . . . . . . . . . . . | . . . . . . . . . . . . . . . . . . | . . . . . . . . . . . |

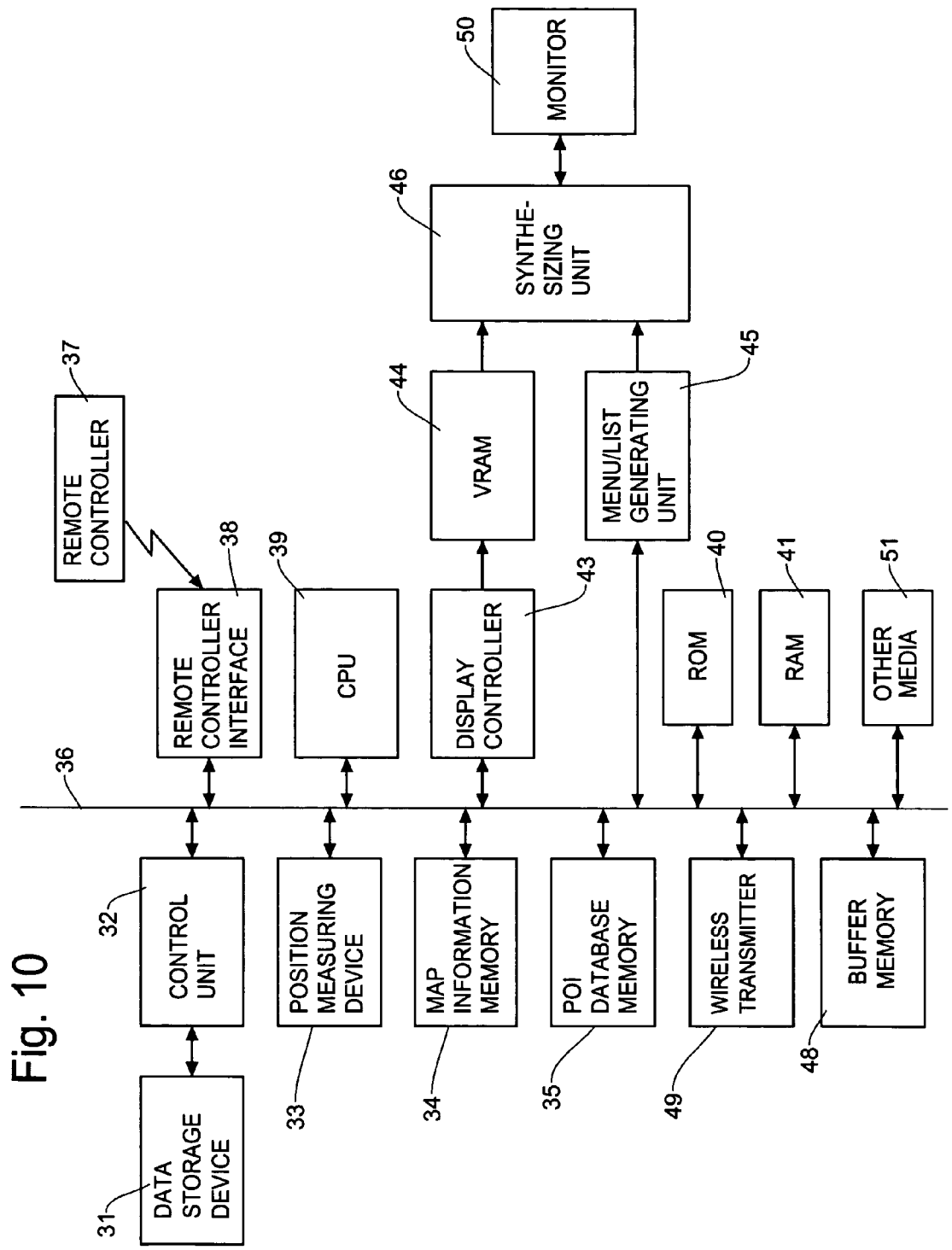

METHOD AND APPARATUS FOR ASSOCIATING BRAND ICON WITH POI LOCATION FOR NAVIGATION SYSTEM

FIELD OF THE INVENTION

This invention relates generally to a method and apparatus for assigning a brand icon to a particular place, and more particularly, to a method and apparatus for assigning a brand icon to a particular place such as a point of interest so that the brand icon can be used to represent the location of the place on a map or menu image, thereby allowing a user to easily identify the particular place.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. FIGS. 1A-1H show an example of overall procedure and screen display involved in the navigation system for route guidance to a destination.

FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIG. 1B-1F. A main menu screen such as shown in FIG. 1B displays menu items including a "Destination" menu for entering the destination. When selecting "Destination", the navigation system displays a "Find Destination by" screen as shown in FIG. 1C for specifying an input method for selecting the destination.

When selecting, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Type" is selected in FIG. 1D, the navigation system lists categories of POIs as shown in FIG. 1E. The user selects a desired category of POIs from the lists.

FIG. 1F shows a screen displayed when the user has selected a "Fast Foods" category in the example of FIG. 1E. In this example, the screen includes the name of POI type "Fast Foods" at the top and a list of names of the fast food restaurants typically sorted by distance from the current user position. The user selects a particular restaurant among the restaurant lists for route guidance.

In FIG. 1G, the navigation system calculates an appropriate route to the destination. After determining the calculated route, the navigation system starts the route guidance as shown in FIG. 1H. Typically, the navigation system shows the intersection that is highlighted to show the next turn and a direction of the turn. The search method in a conventional navigation system works if there is only one destination. However, it cannot successfully answer the need of a user who wants to search multiple points of interest of the same type or name and obtain the most efficient route to accomplish purposes of the trip.

Often, when POIs are displayed on the map image of the navigation system, generic icons are displayed. For example, generic icons representing restaurants and gas station may be displayed on the map image as shown in FIG. 2. A generic icon does not differentiate individual stores but simply shows the type and location of the point of interest. Thus, fast food restaurants such as McDonald, Burger King, Pizza Hut are represented by the same generic icons.

When the navigation system shows a map screen as shown in FIG. 2 where points of interest are represented by the generic icons, the user cannot tell which icons indicate what kind of restaurant. In the case where the user wants to eat at a particular restaurant, for example, Pizza Hut, the user cannot easily tell whether Pizza Hut exists just by looking at the map image with generic icons. Moreover, the user may wish to fill in gasoline at a particular gas station chain store because the user can use a reward card, or at a particular gas station chain store because the user knows that it offers competitive prices.

Many stores and franchise chains have corporate logos, or any other mark which are unique to identify the business. Those marks are often readily recognizable by users since the stores promote the marks for recognition. Most of the restaurants noted above have brand icon (corporate icon), but only texts or generic icons are commonly shown on the screen on the conventional navigation system. If brand icons were displayed on a map or menu image, it would be easier for the user to recognize the POIs.

Accordingly, there is a need to use a brand icon to represent a location of a particular brand name of a particular place to improve operability of the navigation system.

SUMMARY OF THE INVENTION

It is, therefore, an object of the present invention to provide a method and apparatus for a navigation system for associating a brand icon with a particular place such as a point of interest so that the brand icon rather than a generic icon will be displayed on the map or menu image for indicating the particular place.

It is another object of the present invention to provide a method and apparatus for a navigation system which enables a user to easily distinguish a location of a point of interest by displaying a brand icon unique to such a particular point of interest.

One aspect of the present invention is a method for associating a brand icon with a particular place or a point of interest. The method includes the steps of specifying a particular place for a navigation system, checking whether the specified particular place is associated with a brand icon, assigning the brand icon to the particular place when both are associated with one another, storing data regarding the association between the particular place and the brand icon, and displaying the brand icon on a map or menu image of the navigation system when a location of the particular place comes within the map or menu image. The method further includes a step of creating a lookup table listing place names and brand icons so that the navigation system can check whether the specified particular place is associated with the brand icon.

The step of assigning the brand icon to the particular place includes a step of displaying a plurality of icon blocks each showing a generic icon or a brand icon so that a user can select one of the icons to be assigned to the particular place. Further, the step of assigning the brand icon to the particular place includes a step of displaying a plurality of icon blocks each showing a generic icon or a brand icon, and a step of creating a brand icon when desired icon is not found in the icon blocks.

The step of creating the brand icon includes a step of obtaining electronic data of a brand icon through a communication network or other media. Further, the step of creating the lookup table includes a step of obtaining electronic data of place names and brand icons through a communication network or other media. The step of specifying the particular place includes a step of creating destination data and storing the created data in an address book or other recording area of the navigation system.

Another aspect of the present invention is an apparatus for a navigation system for implementing the steps defined in the method of the present invention noted above. The display apparatus includes various means to examine whether the particular place is associated with the brand icon and assign the brand icon to the particular place. The navigation system displays the brand icon on a map image of the navigation system when a location of the particular place comes within the map image.

According to the present invention, the navigation system automatically assigns or allows the user to assign a brand icon to a particular place such as a point of interest (POI) so that the assigned brand icon as well as generic icons are displayed on a map image. Thus, the navigation system enables the user to quickly distinguish a particular place such as a POI from other similar type of POIs on a map or menu image. For example, the user can identify a particular chain restaurant from other restaurant by the brand icon unique to the particular chain restaurant on the map image so that the user can easily specify the favorite restaurant as a destination.

BRIEF DESCRIPTION OF THE DRAWINGS

FIGS. 1A-1H are schematic diagrams showing an example of operational process and screen display involved in the navigation system for selecting a destination.

FIGS. 4A-4B are schematic diagrams showing examples of displays of the navigation system under the present invention to show an example of procedures for modifying the data (phone number of point of interest) to be stored in the address book of the navigation system.

FIGS. 6A-6E are schematic diagrams showing examples of displays of the navigation system under the present invention to show an example of procedures for assigning or editing a brand icon of a point of interest.

FIG. 8 is an example of a look-up table showing the relationship among the franchise and brand IDs, franchise/brand names and brand icons that can be used to associate the brand icon with the location on the map image of the navigation system under the present invention.

FIG. 10 is a block diagram showing an example of configuration of a vehicle navigation system implementing the brand icon assignment in the present invention.

DETAILED DESCRIPTION OF THE PREFERRED EMBODIMENT

The present invention will be described in detail with reference to the accompanying drawings. The method and apparatus for navigation system of the present invention is designed to enable a user to quickly distinguish a particular place such as a point of interest (POI) from other similar type of POIs on a map image. For example, a user can identify a particular chain restaurant from other restaurant by a brand icon unique to the particular chain restaurant on the map image so that the user can easily specify the favorite restaurant as a destination.

In order to achieve this goal, the method and apparatus of the present invention assigns a brand icon to a particular place such as a point of interest (POI) so that the assigned brand icon as well as generic POI icons are displayed on a map image. The assigned brand icons are stored in an icon table (icon blocks) of the navigation system. Many brand icons or corporate logos are readily available from the map data produced by a map data provider or through communication network such as internet so that the user can use such a brand icon as is. Alternatively, the user can create or edit the brand icon and assign such brand icons to his/her favorite POIs.

An example of procedure for associating a brand icon with a particular place or POI according to the present invention is described with reference to the display examples of FIGS. 3A to 6E. Typically, the procedure for associating a brand icon with a POI in the present invention will be conducted when storing information on a destination in an address book of the navigation system. However, the present invention is not limited to the address book but can be applied to other function as well by storing the brand icons in other recording area of the navigation system.

Figure 3A:
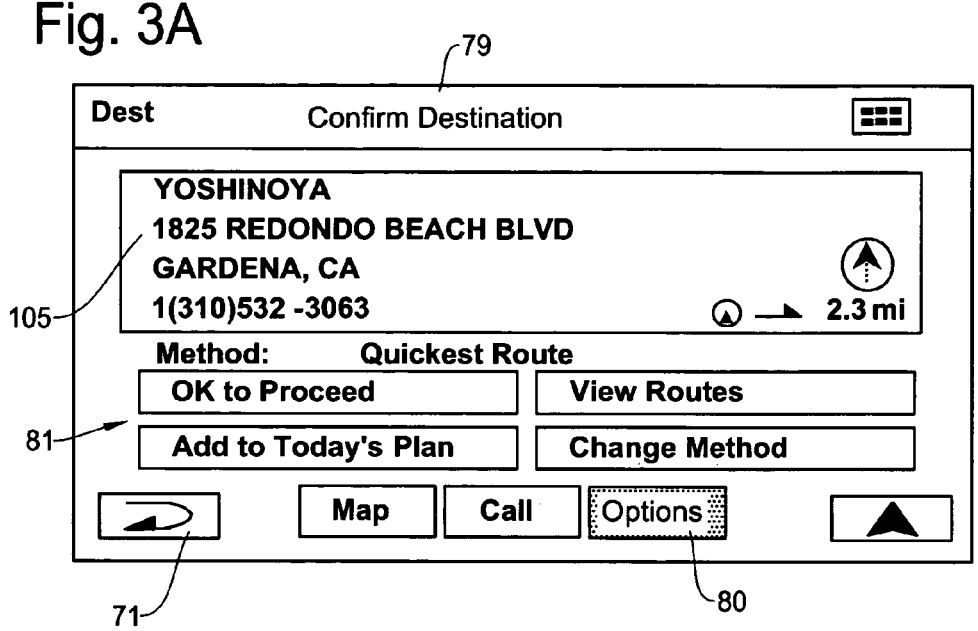
FIGS. 3A-3F are schematic diagrams showing examples of displays of the navigation system under the present invention to show an example of procedures for modifying the data (name of point of interest) to be stored in the address book of the navigation system.

FIG. 3A shows an example of display of the navigation system when a user has selected a particular POI as a destination. This display includes a heading 79 showing an action to be taken by the user, a back button 71 which allows the user to return to the previous screen, an information window 105 which shows the name, address and phone number of the destination, and action buttons 81 for selecting the next action. In this example, the action buttons 81 include "OK to Proceed", "View Routes", "Add to Today's Plan", and "Change Method" buttons.

Figure 3B:
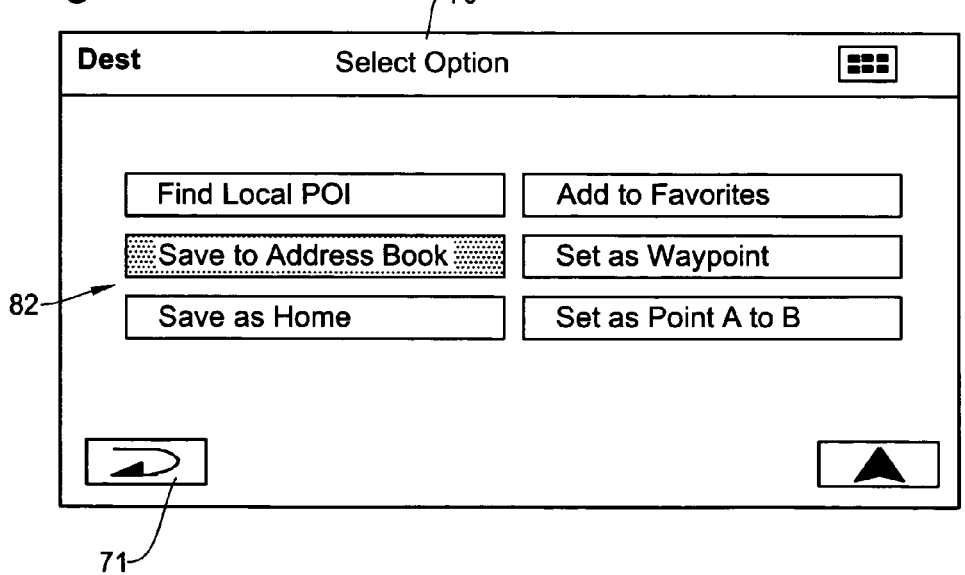

The display example of FIG. 3A also includes an "Options" button 80 which also serves to select a specific function of the navigation system. When the user selects the "Options" button 80, the navigation system will display various options to choose from as shown in FIG. 3B. The heading 79 prompts the user to selection an option from the option buttons 82.

Figure 3C:
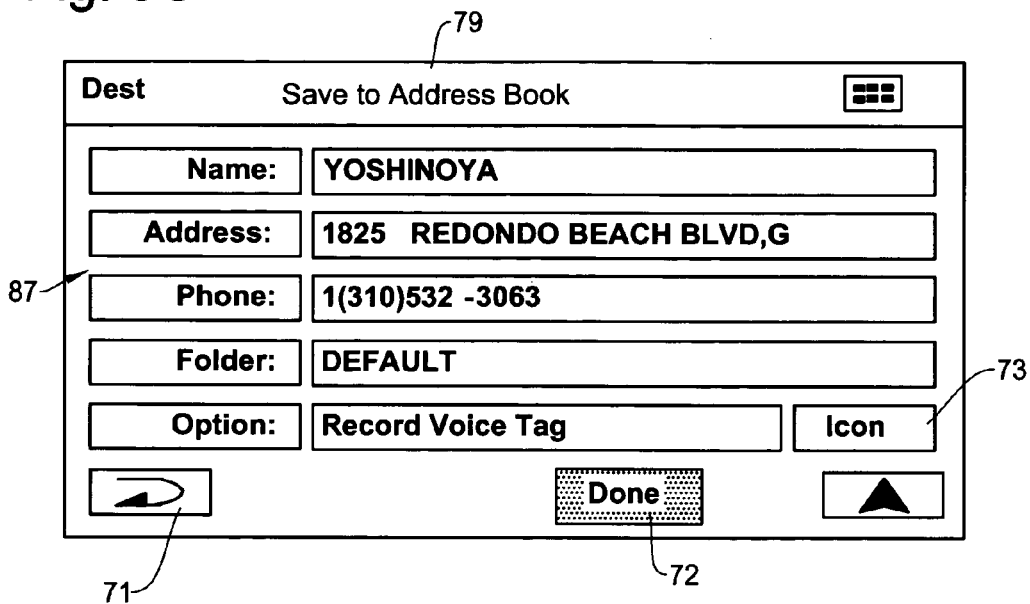

When the user selects the "Save to Address Book" in FIG. 3B, the display of the navigation system will change to the one shown in FIG. 3C. In FIG. 3C, a list of entries is displayed which shows types of information to be stored in the address book. The types of information include a name, an address, a phone number, a folder, and an option associated with the particular destination.

A "Done" button 72 is use to terminate the procedure by saving the information listed on the display in the address book. An "Icon" button 73 is use for conducting the procedure of assigning a brand icon to a particular destination. Thus, in the case where a user wants to store a particular brand icon with respect to the destination listed on the display, the user presses the "Icon" button 73, the details of which will be described later. A "Return" button 71 allows the user to go back to the previous screen of the navigation system.

Figure 3D:
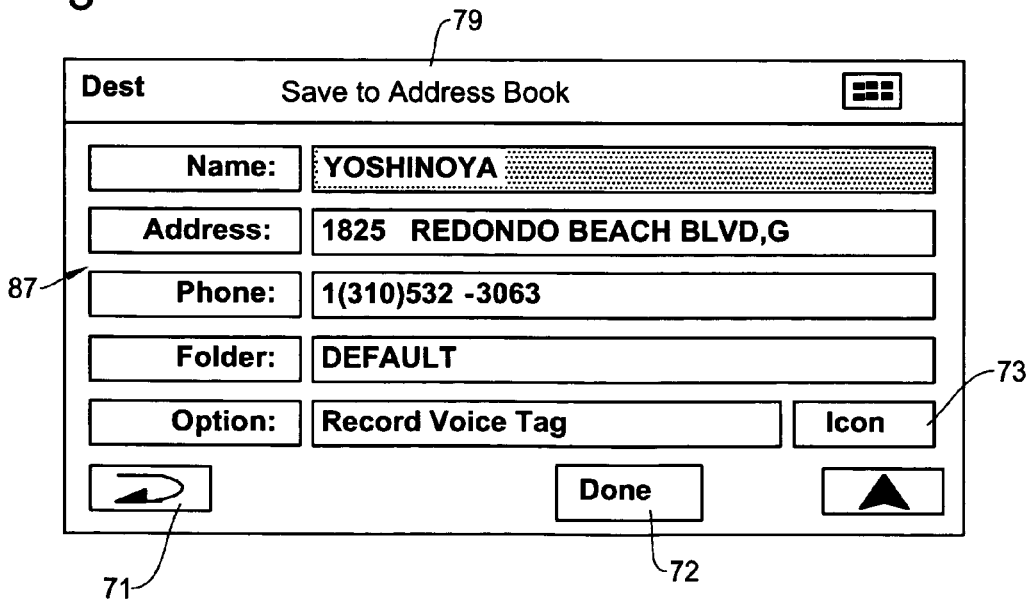
Figure 3E:
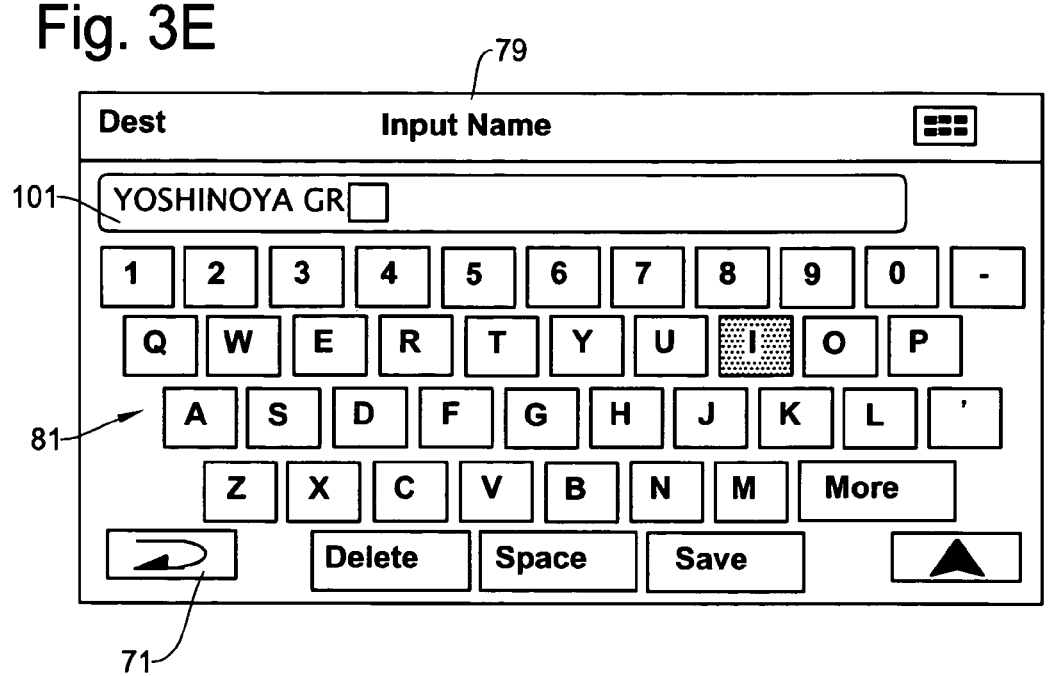
Figure 3F:
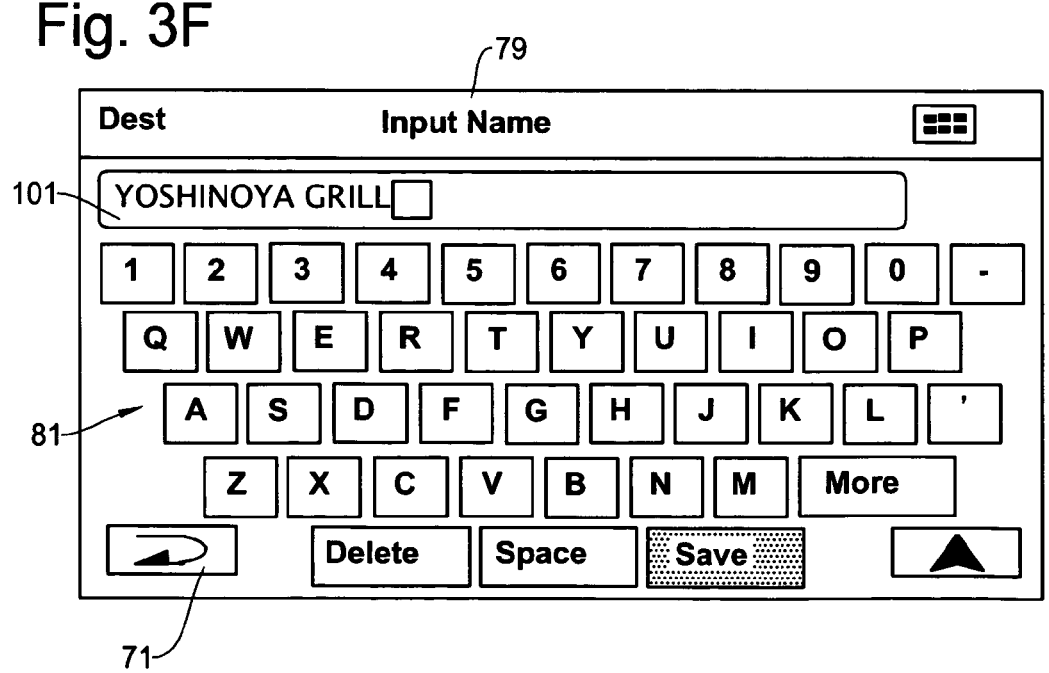

FIGS. 3D-3F show examples of displays of the navigation system under the present invention for modifying the data (name of destination) to be stored in the address book or other recording area of the navigation system. FIG. 3D shows the display listing the information to be stored in the address book, which is identical to that shown in FIG. 3C. However, the name of the destination is highlighted because the user has specified this item to modify the information. Then, the navigation system will show a key board screen of FIG. 3E, which allows the user to edit the name of the destination.

A key board 81 of FIGS. 3E and 3F allows the user to input letters in an input field 101 to modify the name of the destination. In this example, the user wants to change the place name from "YOSHINOYA" to "YOSHINOYA GRILL". As shown in FIG. 3E, the key board 81 highlights the candidate characters for the place name for assisting the user to select the characters. When this procedure is completed, the user presses a "Save" key to store the modified name in the address book as shown in FIG. 3F.

FIGS. 4A and 4B show examples of displays of the navigation system under the present invention for modifying the data (phone number of destination) to be stored in the address book. FIG. 4A shows the display listing the information to be stored in the address book, which is identical to that shown in FIG. 3C. However, the phone number of the destination is highlighted because the user has specified this item to modify the phone number.

Then, the navigation system will show a key board screen of FIG. 4B, which allows the user to edit the phone number of the destination. The user can modify the phone number in the input field 101 by a numeric keypad 83. When this procedure is completed, the user presses a "Save" key to store the modified phone number in the address book.

Figure 5A:
FIGS. 5A-5B are schematic diagrams showing examples of displays of the navigation system under the present invention to show an example of procedures for modifying the data (assigning or creating a folder) to be stored in the address book of the navigation system.
Figure 5B:

Similarly, FIGS. 5A and 5B show examples of displays of the navigation system under the present invention for modifying the data (assigning or creating a folder for the information of the destination) to be stored in the address book or other recording area of the navigation system. FIG. 5A shows the display listing the information to be stored in the address book, which is identical to that shown in FIG. 3C. However, the "Folder" menu in the listed items is highlighted because the user has specified this item to assign or create a folder for the information regarding the destination.

Then, the navigation system will show a folder list 98 listing folder names as shown in FIG. 5B to select the type of folder into which the information regarding the destination is classified. The user can scroll the folder list 98 by operating scroll arrows 93 to see other folder names in the folder list 98. A scroll position indicator 91 may be provided to show a position of the current list relative to an overall list so that the user can anticipate how far the scroll has to be conducted. When there is no appropriate folder in the folder list 98, the navigation system allows the use to create a new folder.

The procedure and display example of an embodiment under the present invention for assigning a brand icon to a location such as a POI is described with reference to FIGS. 6A-6E. This procedure is typically conducted when storing the destination data in the address book of the navigation system as described in the foregoing. However, the present invention is not limited to the address book but can be applied to other function as well by storing the brand icons in other recording area of the navigation system.

Figure 6A:
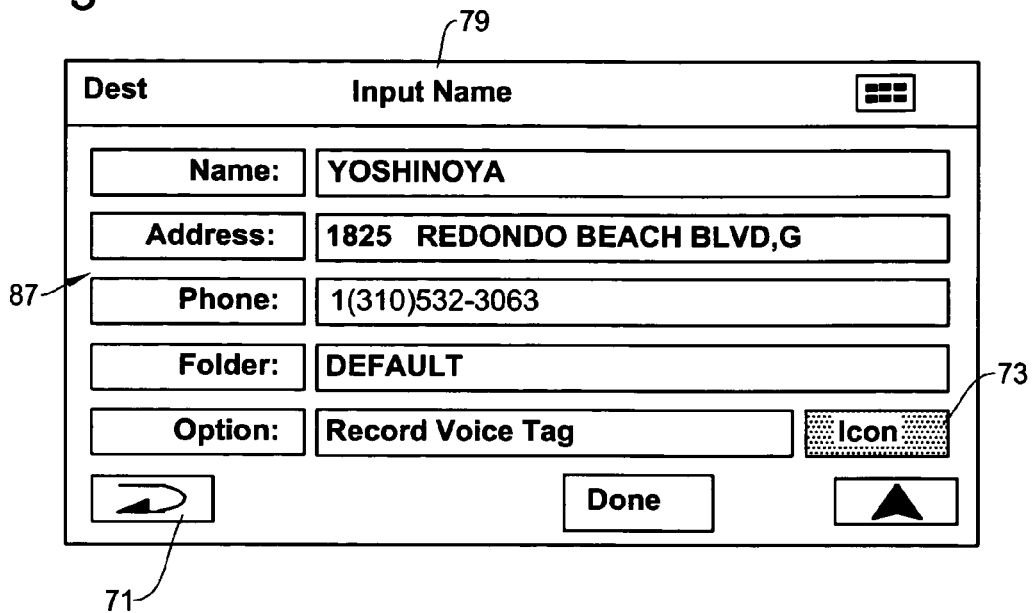
Figure 6B:
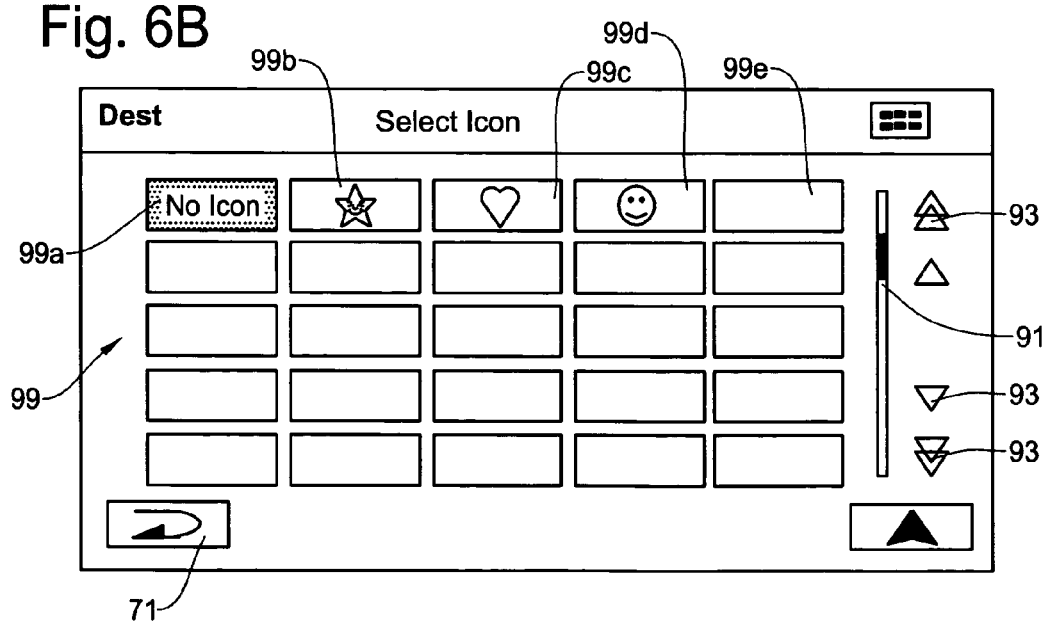

When the user presses the icon button 73 in FIG. 6A which is the same as FIG. 3C, the navigation system displays a screen as shown in FIG. 6B. This display shows a set of icon blocks 99 each icon block showing a generic icon or a brand icon. The navigation system checks whether a brand icon for the location specified by the user exists by examining the icon blocks.

Figure 6C:
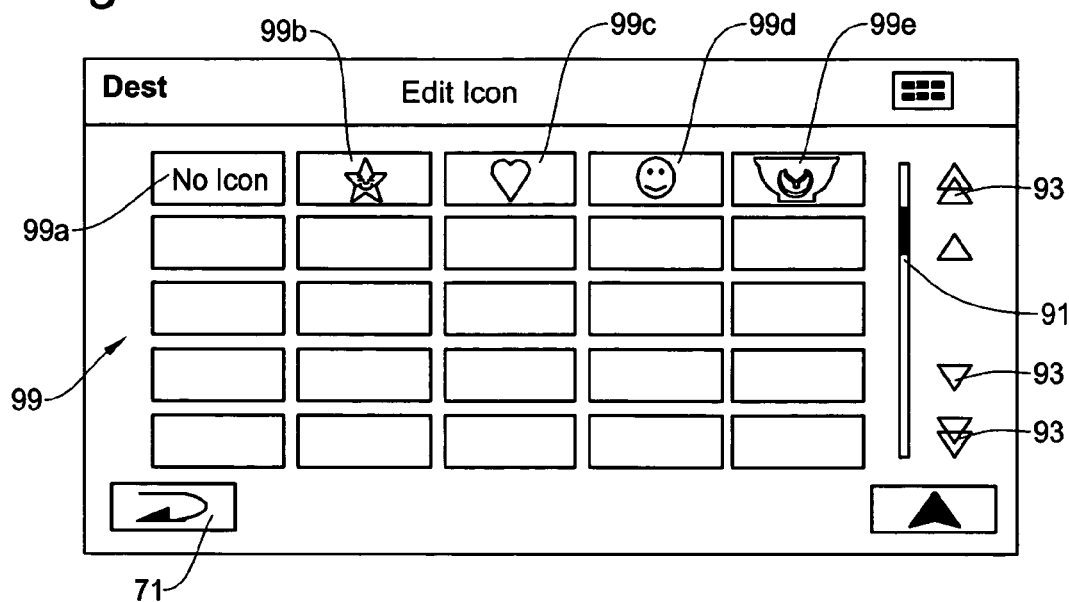

Although only brand icons are specifically illustrated, each icon block 99 shows generic icons such as an icon indicating a restaurant, or an icon indicating a gas station, etc. in the other icon blocks. Such generic icons and brand icons can be listed in the icon blocks automatically if such icons are readily available from data produced by a manufacturer of navigation systems. Further, a user can create an icon by illustrating an icon by himself or copying from a POI's home page through a communication network such as internet, etc., or other media If no brand icon for the specified place, in this example "YOSHINOYA", is stored in the icon block 99, a "No Icon" mark will be highlighted at a predetermined location of the icon block as shown in FIG. 6B. In this example, an icon block 99a shows the "No Icon" mark. FIG. 6C shows the situation where the user is creating a brand icon in an icon block 99e for the place name "YOSHINOYA" which is a chain restaurant of beef-rice bowl. As noted above, it is also possible to create the brand icon by copying electronic data of a mark or logo of the particular restaurant and storing in the icon block 99.

Figure 6D:
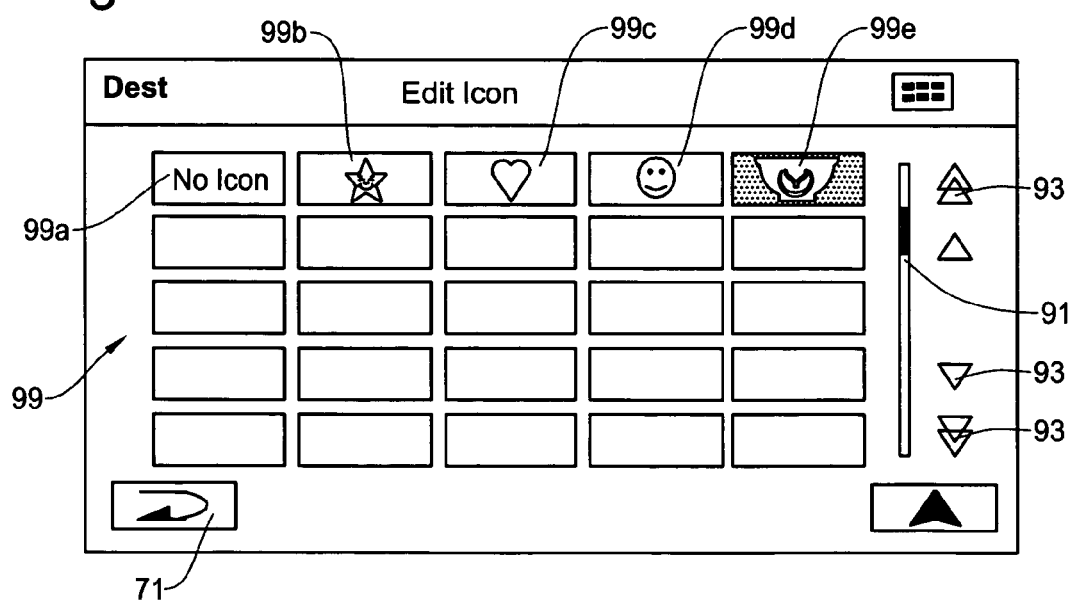
Figure 6E:
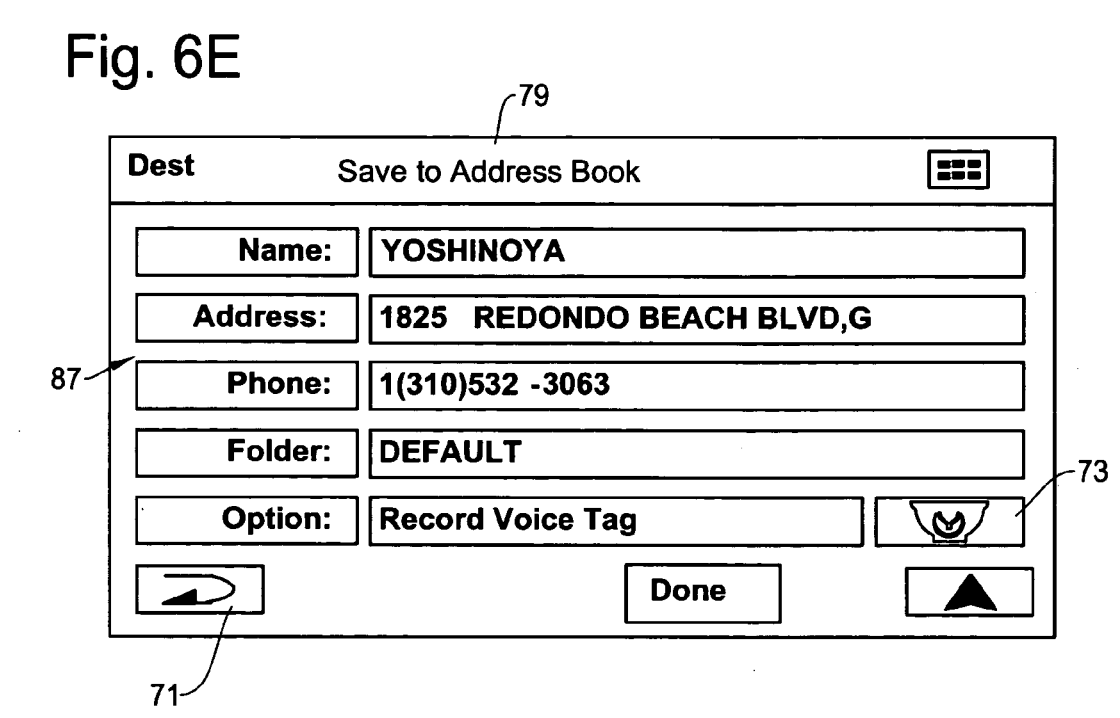

Once the brand icon is created, the user can assign the brand icon in the icon block 99e to the place name "YOSHINOYA" as shown in FIG. 6D. Thus, navigation system registers the brand icon shown on the icon block 99 as the brand icon for the restaurant "YOSHINOYA" by highlighting brand icon at the icon block 99e. The navigation system then displays the address book screen of FIG. 6E which lists the information to be stored in the address book of the navigation system. The icon button 73 now shows an image of the selected brand icon for confirmation. In other words, the brand icon is also displayed on a menu image such as the one shown in FIG. 6E in addition to the map images of FIGS. 7A and 7B.

As noted above, although only brand icons are shown in the icon blocks 99 in the displays shown above, many other icons may also be shown as generic icon candidates. Moreover, the navigation system may show a plurality of candidate brand icons for the same place name (destination) so that the user can select a suitable brand icon. As will be described later in detail, the navigation system in this embodiment has a look-up table that can correlate a location name to a brand icon.

Figure 2:
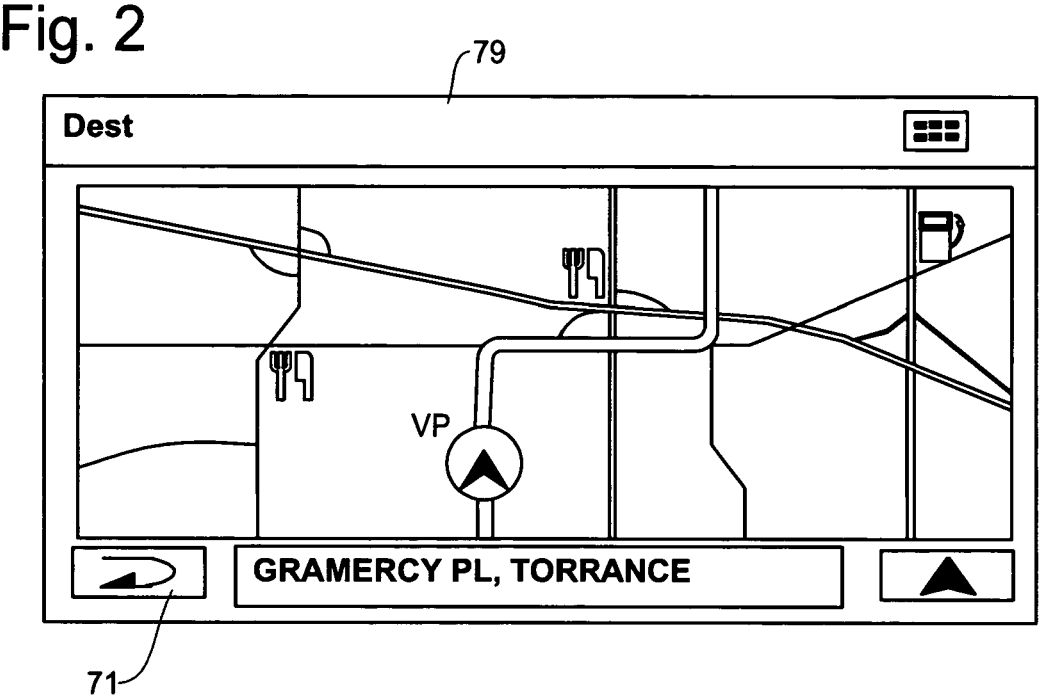
FIG. 2 is a schematic diagram showing an example of a display of navigation system where point of interests are represented by generic icons on a map image.
Figure 7A:
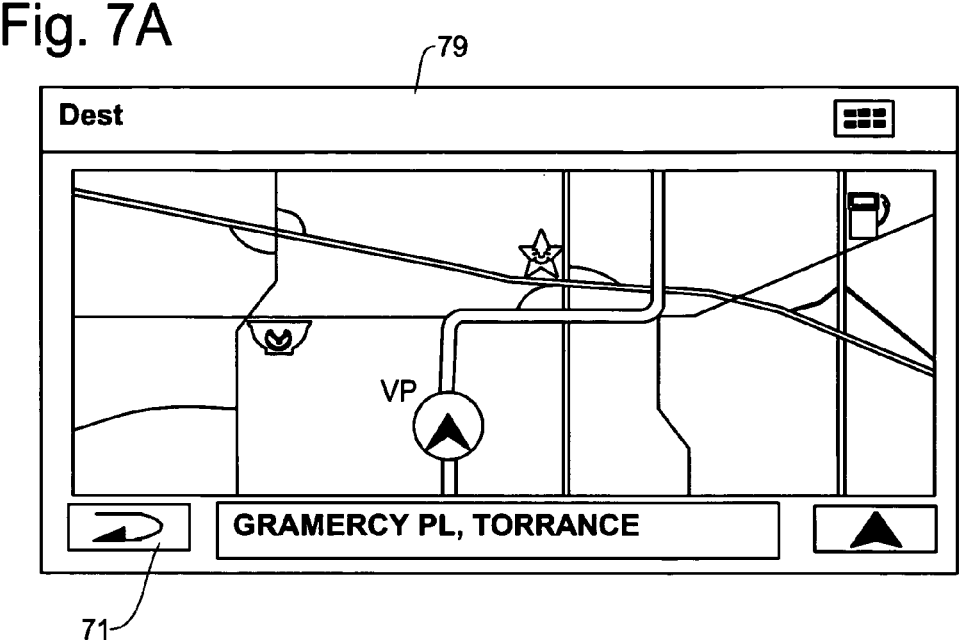
FIGS. 7A and 7B are schematic diagrams showing examples of display where points of interest are represented by brand icons on the map image of the navigation system under the present intention.

FIG. 7A shows a display example similar to the one shown in FIG. 2 except that brand icons associated with the selected points of interest are now displayed on the map image. In this example, the brand icon indicating the specific restaurant "YOSHINOYA" and the brand icon indicating the specific hamburger restaurant "Carl's Jr" are displayed on the map image rather than generic icons indicating restaurants in general. Thus, the user can easily identify what kind of restaurant exist on the map and select the favorite restaurant as a destination.

Figure 7B:
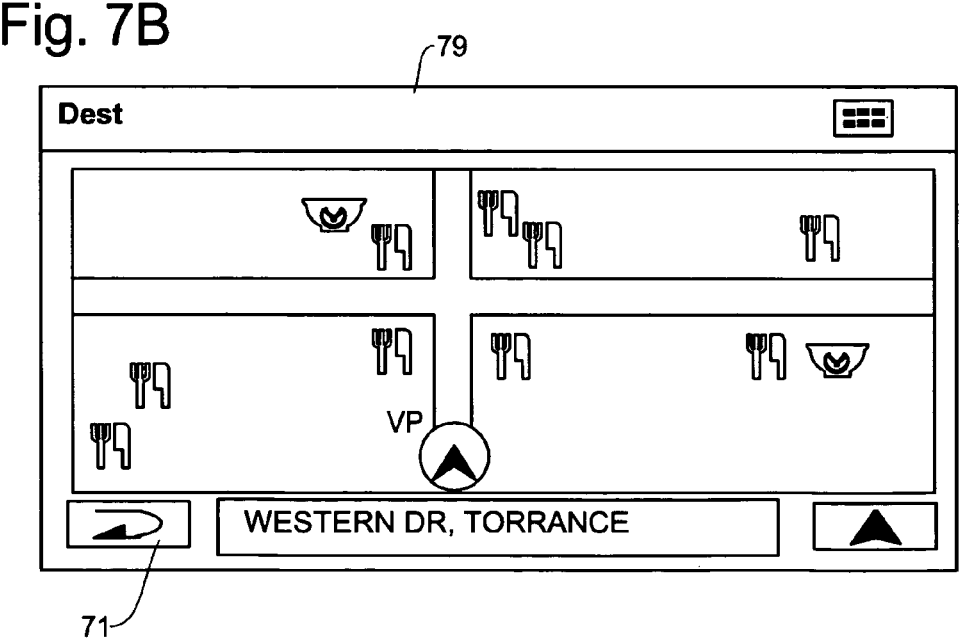

FIG. 7B shows the situation where the navigation system shows a map image of a relatively small area where many restaurants are located. The navigation system shows many generic icons indicating restaurants at their locations on the map screen as well as the brand icon indicating the restaurant "YOSHINOYA" described in the above example. Thus, the user can easily identify his favorite restaurant "YOSHINOYA" on the map image and can specify the brand icon as a destination for the navigation system.

FIG. 8 is an example of a lookup table for checking if a particular brand icon is available for a particular place name or a POI. This table comprises a "Franchise/Brand ID" field, a "Franchise/Brand Name" field, and an "Icon" field. The Franchise/Brand ID field contains unique ID of the brand, and the Franchise/Brand Name field stores the name associated with the Franchise/Brand ID. The Icon field stores graphic representation (brand icon) associated with the Franchise/Brand ID. A raster image or a vector-based image may be used for the icon. As noted above, the icons can be retrieved from the map data of the navigation system or can be created by the user by copying an icon or logo of a POI through a communication network or other media. The lookup table may be updated electronically so that the navigation system can utilize the updated data.

Figure 9:
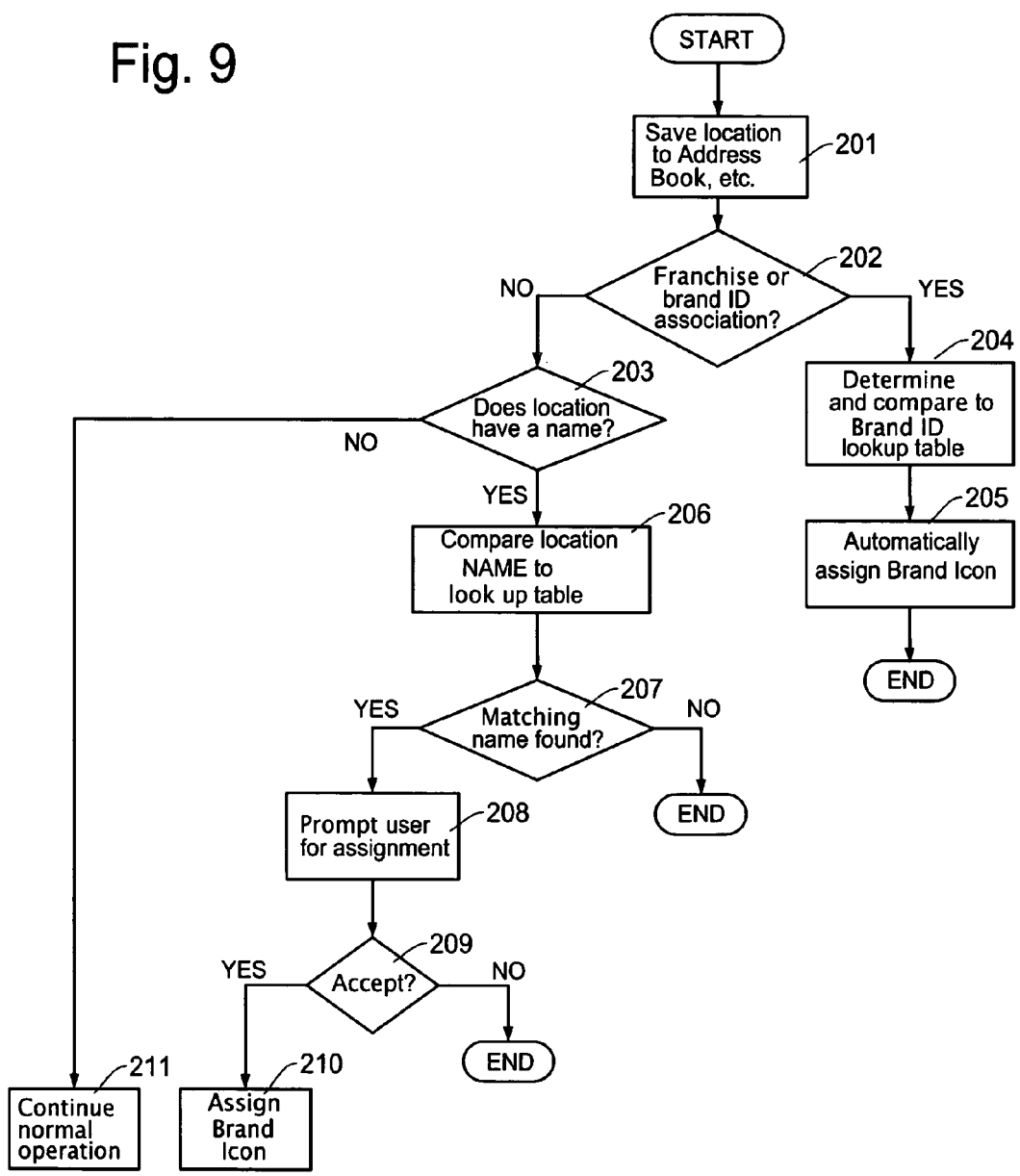
FIG. 9 is a flow chart showing an example of operational steps for searching a brand icon and assigning the brad icon to a point of interest in the address book of the navigation system.

The steps of assigning brand icon to a particular location (destination) in an embodiment under the present invention are explained with reference to the flow chart shown in FIG. 9. This flow chart describes the case where the user saves a location (POI) in the address book of the navigation system and the navigation system assigns a suitable brand icon to the location. However, as noted above, the present invention is not limited to the address book of the navigation system but can be applied to other function of the navigation system as well.

In the first step 201, the user saves the information associated with a location (specified place) to the address book of the navigation system. The navigation system determines whether the place is associated with a franchise or brand ID in step 202. As noted above, the navigation system under the present invention has a lookup table comprising the "Franchise/Brand ID" field, "Franchise/Brand Name" field, and the "Icon" field.

In this step, the navigation system checks whether the associated brand icon exists by searching the look-up table stored in the navigation system and/or the external source through an internet connection, etc. Although the look-up table is used in this example, other type of database or data association may also be used as long as it shows the information as to whether a particular place can be associated with a franchise/brand ID.

If the specified location is associated with the franchise/brand ID, in step 204, the navigation system compares the franchise/brand ID with that in the "Franchise/Brand ID" field of the lookup table. When the franchise/brand ID match with one another, at step 205, the navigation system automatically assigns the brand icon to the specified location. Thus, the brand icon rather than a generic icon will be displayed on the map image when the specified location is within the map image.

If the specified location is not associated with the franchise/brand ID, the navigation system determine whether the location has a name in step 203. The name of the location may be automatically provided by the navigation system based on the map data or manually entered by the user. For example, the name of the location is likely to exist if the location is a POI that does not have a Franchise/Brand ID association. The location does not likely have a name if it is a new POI that has not been digitized yet.

In the case where there is no name associated with the location, the navigation system continues the normal operation without assigning a brand icon to that location in step 211. The user may choose to assign a generic icon or predefined icon provided by the navigation system. If the location has a name, the navigation system will compare the location name to the entries in the Franchise/Brand name field in the look up table at step 206.

If a matching name is found in step 207, the navigation system prompts the user whether the user wishes to accept the brand icon for the location in step 208. The navigation system may display one candidate brand icon for the location or a plurality of candidate brand icons from which the user can select a suitable icon. It is also possible to display generic icons, such as a restaurant icon or a hotel icon, in addition to the brand icon such that the user may assign a generic icon instead of a brand icon to the location.

If the user has declined to assign the icon to the location, the procedure of assigning an icon to the location terminates, and the navigation system continues the normal operation. If the user accepts the icon in step 209, the navigation system assigns the brand icon to the location in step 210. Thus, the brand icon rather than a generic icon will be displayed on the map image when the specified location comes within the map image.

FIG. 10 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage, device 31 such as a hard disc, CD-ROM, DVD or other storage means for storing the map data. The brand icons and the look-up table are also stored in the data storage device 31. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver, and etc.

The block diagram of FIG. 10 further includes a map information memory 34 for storing the map information which is read from the data storage device 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 10, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/ various list images, a synthesizing unit 46, a wireless receiver 49 for wireless communication to retrieve data from a remote server, a buffer memory 48 for temporally storing data for ease of data processing, a monitor (display) 50, and other media 51.

In the configuration described above, the data storage medium 31 stores the map data which also typically includes brand icons and generic icons. Alternatively, the brand icons and generic icons and the lookup table noted above may be created by a manufacturer of navigation systems based on the map data or other data source and stored in a memory such as the POI database memory 35 or the other media 51. The wireless receiver 49 may have a functionality of retrieving updated data for brand icons through wireless communication. The CPU 39 controls the overall operation of the navigation system including the procedure of the present invention for assigning the brand icon to the specified place and displaying the assigned brand icon.

As has been described above, according to the present invention, the navigation system automatically assigns or allows the user to assign a brand icon to a particular place such as a point of interest (POI) so that the assigned brand icon as well as generic POI icons are displayed on a map image. Thus, the navigation system enables the user to quickly distinguish a particular place such as a POI from other similar type of POIs on a map image. For example, the user can identify a particular chain restaurant from other restaurant by the brand icon unique to the particular chain restaurant on the map image so that the user can easily specify the favorite restaurant as a destination.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for a navigation system for assigning a brand icon to a particular place, comprising the following steps of:
    specifying a particular place for a navigation system for creating a lookup table related to brand icons where a brand icon identifies a particular business located at the particular place;
    checking whether the specified particular place is associated with a brand icon;
    assigning the brand icon to the particular place when both are associated with one another, the step including a step of displaying a plurality of icon blocks each showing a generic icon or a brand icon so that a user can select one of the icons to be assigned to the particular place;
    storing data regarding the association between the particular place and the brand icon, thereby creating the lookup table in the navigation system;
    displaying a map image or a menu image on a display screen of the navigation system for selecting a place to visit or selecting a menu item;
    displaying the brand icon retrieved from the lookup table on the map or menu image when a location of the particular place comes within a range of the image that can be displayed on the display screen; and
    displaying a generic icon for each remaining location on the map or menu image;
    wherein the generic icon represents a generic category or type of business rather than a particular business and its location represented by the brand icon, and wherein the brand icon is a graphic representation that uniquely identifies a particular business that is indistinguishable by the generic icon and wherein the lookup table has a franchise/brand ID and an icon field that stores graphic representation associated with the franchise/brand ID.

2. A method for a navigation system as defined in claim 1, said lookup table lists place names and brand icons so that the navigation system can check whether the specified particular place is associated with the brand icon.

3. A method for a navigation system as defined in claim 1, wherein said step of checking whether the specified particular place is associated with a brand icon includes a step of determining whether the specified particular place has a location name and comparing the location name to entries in the Franchise/Brand name field in the look up table.

4. A method for a navigation system as defined in claim 1, wherein said step of assigning the brand icon to the particular place includes a step of displaying a plurality of icon blocks each showing a generic icon or a brand icon, and a step of creating a brand icon when desired icon is not found in the icon blocks.

5. A method for a navigation system as defined in claim 1, wherein said step of assigning the brand icon includes a step of obtaining electronic data of a brand icon through a communication network or other media.

6. A method for a navigation system as defined in claim 1, wherein said step of specifying the particular place and creating the lookup table includes a step of obtaining electronic data of place names and brand icons through a communication network or other media.

7. A method for a navigation system as defined in claim 1, wherein said step of specifying the particular place includes a step of creating destination data and storing the created data in an address book or other recording area of the navigation system.

8. A method for a navigation system as defined in claim 1, wherein said particular place is a one belong to a group of organizations with a same name including chain stores and franchise stores.

9. An apparatus for a navigation system for assigning a brand icon to a particular place, comprising:
    a data storage device which stores map data related to determining a preferable route between a start point and a destination, said map data including information on POIs (points of interest) and associated icons;
    a monitor for displaying information and images related to operations of selecting brand icons or generic icons of the POIs to be displayed and route guidance to the destination;
    a controller for controlling overall operations of a route search process for assigning an icon to a location of a map image or a menu on the monitor screen and a route guidance process for guiding a user to the destination through the preferable route;
    wherein the controller controls the following operations of:
        specifying a particular place for a navigation system for creating a lookup table related to brand icons based on the map data from the data storage device where a brand icon identifies a particular business located at the particular place;
        checking whether the specified particular place is associated with a brand icon;
        assigning the brand icon to the particular place on the map image or menu when both are associated with one another;
        displaying a plurality of icon blocks each showing a generic icon or a brand icon so that a user can select one of the icons to be assigned to the particular place;

storing data regarding the association between the particular place and the brand icon in the data storage device or other memory, thereby creating the lookup table in the navigation system;

displaying a map image or a menu image on the monitor of the navigation system for selecting a place to visit or selecting a menu item;

displaying the brand icon retrieved from the lookup table on the map or menu image on the monitor when a location of the particular place comes within a range of the image that can be displayed on the display screen; and displaying a generic icon for each remaining location on the map or menu image on the monitor; and wherein the generic icon represents a generic category or type of business rather than a particular business and its location represented by the brand icon and wherein the brand icon is a graphic representation that uniquely identifies a particular business that is indistinguishable by the generic icon and wherein the lookup table has a franchise/brand ID and an icon field that stores graphic representation associated with the franchise/brand ID.

10. An apparatus for a navigation system as defined in claim 9, wherein said lookup table lists place names and brand icons so that the navigation system can check whether the specified particular place is associated with the brand icon.

11. An apparatus for a navigation system as defined in claim 9, wherein said controller further controls an operation of said operation of checking whether the specified particular place is associated with a brand icon includes an operation of determining whether the specified particular place has a location name and comparing the location name to entries in the Franchise/Brand name field in the look up table.

12. An apparatus for a navigation system as defined in claim 9, wherein said controller further controls an operation of displaying a plurality of icon blocks each showing a generic icon or a brand icon and creating a brand icon when desired icon is not found in the icon blocks.

13. An apparatus for a navigation system as defined in claim 9, wherein said controller further controls an operation of obtaining electronic data of a brand icon through a communication network or other media.

14. An apparatus for a navigation system as defined in claim 9, wherein said controller further controls an operation of obtaining electronic data of place names and brand icons through a communication network or other media.

15. An apparatus for a navigation system as defined in claim 9, wherein said controller further controls an operation of creating destination data and storing the created data in an address book or other recording area of the navigation system.

16. An apparatus for a navigation system as defined in claim 9, wherein said particular place is a one belong to a group of organizations with a same name including chain stores and franchise stores.

* * * * *